United States Patent [19]

Knickel et al.

[11] 3,960,590

[45] June 1, 1976

[54] MODIFIED CHROMIUM OXIDE PIGMENT

[75] Inventors: Birger Knickel, Meerbusch-Lank; Siegfried Keifer, Krefeld; Hermann Perrey, Krefeld; Hans Rudolph, Krefeld; Hans Jurgen Rosenkranz, Krefeld; Reinhold Rudisch, Krefeld, all of Germany

[73] Assignee: Bayer Aktiengesellschaft, Germany

[22] Filed: Nov. 14, 1974

[21] Appl. No.: 523,879

[30] Foreign Application Priority Data
Nov. 21, 1973 Germany............................ 2358016

[52] U.S. Cl............................. 106/302; 106/308 N
[51] Int. Cl.².......................................... C09C 1/34

[58] Field of Search............ 106/308 N, 302, 308 S; 260/556 A, 556 AR

[56] References Cited
UNITED STATES PATENTS

| | | | |
|---|---|---|---|
| 3,156,665 | 11/1964 | Brossman et al. | 106/308 N |
| 3,404,119 | 10/1968 | Hayser et al. | 106/308 S |

Primary Examiner—Winston A. Douglas
Assistant Examiner—J. V. Howard
Attorney, Agent, or Firm—Connolly and Hutz

[57] ABSTRACT

Chromium oxide pigments intimately admixed with an alkoxylated alkyl sulphonamide to obtain a pigment having a low degree of flocculation.

5 Claims, No Drawings

MODIFIED CHROMIUM OXIDE PIGMENT

This invention relates to improved chromium oxide pigments which have practically no tendency to flocculate.

Chromium oxide pigments are relatively difficult to wet in organic binders and, therefore, they tend to flocculate in paints. By flocculation is meant the grouping together of several chromium oxide particles into larger agglomerates, so-called flocculates. This flocculation is accompanied by a reduction in the scattering power of the pigmented systems and therefore results in lacquer paints with a darker colour. When a surface freshly lacquered with this lacquer paint is subjected when almost dry to mechanical forces, the lacquer shows colour differences due to local destruction of the flocculates. In addition, these flocculates require a larger quantity of binder so that the lacquer systems become depleted of binder and the lacquer is reduced in gloss. It is therefore of great interest to the lacquer industry to obtain chromium oxide pigments which have little or no tendency to flocculate.

Numerous methods of after-treating chromium oxide are already described in the literature, for example in British Patent Specification No. 94 755 it is described that a colour modification of the pigment is achieved by treating chromium oxide with aluminium oxide, cobalt oxide and titanium dioxide. German Offenlegungsschrift No. 1 902 085 describes how the action of aluminium oxide on chromium oxide increases the chemical resistance of the pigment. None of these treatments, however, in any way reduces the tendency of the pigment to flocculate.

It has now surprisingly been found that the after-treatment of chromium oxide pigments with alkoxylated alkylsulphonamides results in a considerable reduction of flocculation in paints.

This invention therefore relates to chromium oxide pigments which are after-treated with alkoxylated alkyl sulphonamides and have a low degree of flocculation. The chromium oxide pigments are charged with an alkoxylated alkyl sulphonamide content of 0.01 to 30% by weight, preferably 0.2 to 2%.

Suitable alkoxylated sulphonamides for the purpose of the invention are compounds of the general formula

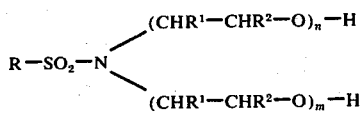

wherein R denotes a straight chain or branched, optionally fluorinated chlorinated or brominated alkyl group, alkylaryl group, e.g. alkylphenyl, or aryl group, preferably the phenyl group, with up to 30 C atoms, preferably 8 to 20 C atoms;

$R^1$ and $R^2$ denote, independently of each other, hydrogen, methyl, chloromethyl, ethyl and phenyl;

n denotes a number of from 1 to 100; and m denotes a number from 0 to 100.

Compounds in which R represents $C_{10}$ to $C_{20}$ alkyl, $R^1$ represents hydrogen, $R^2$ represents hydrogen or methyl, n represents integers from 5 to 20 and m represents zero are particularly preferred. They can easily be obtained by ethoxylation and/or propoxylation of the corresponding alkyl sulphonamides which in turn may be obtained by alkyl sulphochlorination of paraffin fractions with a chain length of 10 to 20 carbon atoms followed by reaction with ammonia. The sulphochlorination reaction, preparation of alkyl sulphonamides from alkylsulphochlorides and composition of the products are known per se (see e.g. F. Asinger, Chemie und Technologie der Paraffinkohlenwasserstoffe, 1956, pages 395–474).

Ethoxylated products such as $C_{12}$–$C_{18}$–alkyl–$SO_2$–NH–$(C_2H_4O)_nH$ wherein n has a value between 7.5 and 12.5 are particularly preferred for this purpose of this invention.

Chromium oxide pigments suitable for treatment with alkoxylated sulphonamides may be obtained in known manner, e.g. by reduction of potassium dichromate with sulphur, although chromium oxide pigments prepared by any other method can be after-treated according to the invention in the same manner. The after-treatment of chromium oxide may be carried out, for example, after reduction and after the sodium sulphite formed has been washed out. The pigment is then dried and ground in a steam jet mill. If desired, however, an aqueous or organic solution or solvent-free melt of the after-treatment agent may be applied to the pigment during the grinding process. Another possible method of after-treatment consists of introducing the after-treatment substance into an aqueous suspension of chromium oxide or spraying an aqueous or organic solution or solvent-free melt of the after-treatment substance on the dried pigment in a conventional mixing apparatus. The methods of application of the after-treatment susbtance indicated here should not, however, restrict the process according to the invention.

The after-treated chromium oxides are preferably used for pigmenting paints. The after-treatment results in a considerably reduced degree of flocculation in long oil and medium oil type resins and in stoving systems. The treated pigments can therefore be used with better results in a relatively wide range of binders, for example they are found to be particularly valuable as exceptionally lightfast pigments in industrial lacquers.

The after-treatment of the chromium oxide pigments with alkoxylated alkyl sulphonates in accordance with the invention does not have any deleterious effect on any other properties of the pigments such as their colour, lightfastness, heat resistance and compatibility and ability to be combined with any of the conventional auxiliary agents used in paints.

The following Examples serve to illustrate the process according to the invention in more detail (percentages given are percent by weight):

PREPARATION OF THE AFTER-TREATED PIGMENT 100 g of pure, ground chromium oxide (Type GNM, Bayer AG, Leverkusen) were suspended in 300 ml of $H_2O$, and a solution of 1 g of a 9.5 mol ethoxylated $C_{12}$–$C_{18}$alkyl sulphonamide mixture in 50 ml of water was added to the suspension. The suspension is vigorously stirred for one hour. The water is then removed by distillation and the pigment dried at 100°C. After incorporation in paints, the after-treated pigment has only a low degree of flocculation compared with untreated chromium oxide.

EXAMPLE 1

Untreated chromium oxide green with a pigment volume concentration (PVK) of 10% and chromium oxide green which has been after-treated as described above were triturated in a vibratory ball mill for 4 hours in a long oil alkyd resin which had been modified with vegetable fatty acids and has an oil content of 66% and a phthalic acid anhydride content of 25%. The lacquer was then applied to a glass plate in a thickness of 180 $\mu$, using an automatic film drawing apparatus. 30 minutes after application, part of the lacquer film was rubbed out perpendicularly to the direction of application and the brightness differences $\Delta Y$ between rubbed and unrubbed surface were determined optically, $\Delta Y$ being a measure of the flocculation. The untreated chromium oxide had a $\Delta Y$ value of 0.8 and the chromium oxide after-treated as described above had a Y-value of 0.2 (brightness measurement was carried out according to DIN 5033, Sheet 7).

EXAMPLE 2

Untreated chromium oxide green and chromium oxide green which has been after-treated as described above were triturated in a medium oil alkyd resin modified with drying vegetable fatty acids and having an oil content of 50% and phthalic acid anhydride content of 28%, and then tested optically as described in Example 1. The $\Delta Y$ value of the untreated chromium oxide was 0.6 and that of the chromium oxide which had been after-treated as described above was 0.3.

EXAMPLE 3

Untreated chromium oxide green with a PVK of 10% and similar chromium oxide green which had been after-treated as described above were triturated in a vibratory ball mill for 4 hours in a short oil alkyd resin based on low molecular weight, saturated synthetic fatty acids, which resin had an oil content of 24% and a phthalic acid anhydride content of 43% and was combined with a melamine resin in proportions of 75:25. The lacquer was then sprayed on a contrasting surface until the surface was completely covered. After 5 minutes, part of the lacquer film was rubbed out perpendicularly to the direction of spraying and the brightness differences $\Delta Y$ of rubbed and unrubbed surface were determined optically. The $\Delta Y$ value of the untreated chromium oxide was 1.2 and that of the chromium oxide which had been after-treated as described above was 0.4.

EXAMPLE 4

Untreated chromium oxide green and chromium oxide green which had been after-treated according to the invention were triturated in a self-cross linking stoving system consisting of a thermosetting acrylate resin as described in Example 3 and examined optically.

The $\Delta Y$ value of the untreated chromium oxide was 1.0 and that of the oxide which had been treated as described above was 0.5.

EXAMPLE 5

100 g pure, ground chromium oxide were suspended in 300 ml of $H_2O$ and a solution of 1 g of a $C_{10}$–$C_{13}$ alkyl sulphonamide with 3 mol ethyleneoxide mixture in 50 ml of water was added to the suspension. The suspension was stirred for one hour, the water removed and the pigment dried at 100°. The after-treated pigment had a value of $\Delta Y = 0.1$ in the long oil alkyd resin of example 1, a value of $\Delta Y = 0.2$ in the medium oil alkyd resin of example 2, a value of $\Delta Y = 0.5$ in the short oil alkyd resin of example 3, a value of $\Delta Y = 0.4$, in the self-crosslinking stoving system of example 4.

EXAMPLE 6

100 g of pure, ground chromium oxide were suspended in 300 ml of $H_2O$ and a solution of 1 g of a $C_{10}$ – $C_{13}$ alkyl sulphonamide with 15 mol ethyleneoxide mixture in 50 ml of water was added to the suspension. The suspension was stirred for one hour, the water removed and the pigment dried at 100°. The after-treated pigment had a value of $\Delta Y = 0.2$ in the long oil alkyd resin of example 1, a value of $\Delta Y = 0.1$ in the medium oil alkyd resin of example 2, a value of $\Delta Y = 0.6$ in the short oil alkyd resin of example 3, a value of $\Delta Y = 0.3$ in the self-cross linking stoving system of example 4.

EXAMPLE 7

100 g of pure, ground chromium oxide were suspended in 300 ml of $H_2O$ and a solution of 1 g of a $C_{12}$ – $C_{18}$ alkyl sulphonamide with 5 mol ethyleneoxide mixture in 50 ml of water was added to the suspension. The suspension was stirred for one hour, the water removed and the pigment dried at 100°. The after-treated pigment had a value of $\Delta Y = 0.1$ in the long oil alkyd resin of example 1, a value of $\Delta Y = 0.2$ in the medium oil alkyd resin of example 2, a value of $\Delta Y = 0.4$ in the short oil alkyd resin of example 3, a value of $\Delta Y = 0.2$ in the self-cross linking stoving system of example 4.

What is claimed is:

1. A modified chromium oxide pigment comprising chromium oxide pigment intimately admixed with 0.01 to 30% by weight, based on said pure chromium oxide pigment, of a compound of the formula

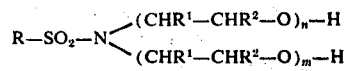

wherein R is straight or branched chain alkyl 8 to 30 carbon atoms; said alkyl substituted by fluorine, chlorine or bromine, alkaryl having up to 30 carbon atoms or phenyl; $R^1$ and $R^2$ are each, independently of the other, hydrogen, methyl, chloromethyl, ethyl or phenyl; n is a number from 1 to 100 and m is a number between 0 and 100.

2. The modified chromium oxide pigment of claim 1 wherein R is straight or branched chain alkyl having 8 to 20 carbon atoms; said alkyl substituted by fluorine, chlorine or bromine; alkaryl having from 8 to 20 carbon atoms or phenyl.

3. The modified chromium oxide pigment of claim 1 wherein R is alkyl having 12 to 18 carbon atoms, $R^1$ and $R^2$ are each hydrogen, n has a value between 7.4 and 12.5 and m is 0.

4. The modified chromium oxide pigment of claim 1 wherein R is straight or branched chain alkyl having 10 to 20 carbon atoms, $R^1$ is hydrogen, $R^2$ is hydrogen or methyl, n is an integer from 5 to 20 and m is 0.

5. The modified chromium oxide pigment of claim 1 wherein said percentage by weight is from 0.2 to 2%.

* * * * *